(12) United States Patent
Foster et al.

(10) Patent No.: US 6,840,408 B1
(45) Date of Patent: Jan. 11, 2005

(54) AIR FOAM PUMP WITH SHIFTING AIR PISTON

(75) Inventors: Donald D. Foster, St. Charles, MO (US); Philip L. Nelson, Wildwood, MO (US)

(73) Assignee: Continental AFA Dispensing Company, St. Peters, MO (US)

( * ) Notice: Subject to any disclaimer, the term of this patent is extended or adjusted under 35 U.S.C. 154(b) by 0 days.

(21) Appl. No.: 10/647,370

(22) Filed: Aug. 25, 2003

(51) Int. Cl.[7] .................................................. B67D 5/58
(52) U.S. Cl. .................................... 222/190; 222/321.9
(58) Field of Search ........................... 222/189.11, 190, 222/321.7, 321.9

(56) References Cited

U.S. PATENT DOCUMENTS

| | | |
|---|---|---|
| 3,359,917 A | 12/1967 | Cooprider |
| 4,219,159 A | 8/1980 | Wesner |
| 4,277,001 A | 7/1981 | Nozawa |
| 4,349,131 A | 9/1982 | Arabian |
| 4,402,432 A | 9/1983 | Corsette |
| 4,438,871 A | 3/1984 | Eckert |
| 4,516,727 A | 5/1985 | Saito et al. |
| 4,850,517 A | 7/1989 | Ter Stege |
| 4,932,567 A | 6/1990 | Tanabe et al. |
| 5,071,379 A | 12/1991 | Poizot |
| 5,271,530 A | 12/1993 | Uehira et al. |
| 5,337,929 A | 8/1994 | Van der Heijden |
| 5,351,862 A | 10/1994 | Weag |
| 5,429,279 A | 7/1995 | Van Der Heijden |
| 5,443,569 A | 8/1995 | Uehira et al. |
| 5,570,819 A | 11/1996 | Uehira et al. |
| 5,715,973 A | 2/1998 | Foster et al. |
| 5,732,855 A | 3/1998 | Van der Heijden |
| 5,752,626 A | 5/1998 | Bachand |
| 5,775,547 A | 7/1998 | Foster et al. |
| 5,779,104 A | 7/1998 | Reidel |
| 5,794,821 A | 8/1998 | Foster et al. |
| 5,813,576 A | 9/1998 | Iizuka et al. |
| 5,918,771 A | 7/1999 | Van der Heijden |
| 5,927,561 A | 7/1999 | Foster et al. |
| 6,053,364 A | 4/2000 | Van der Heijden |
| 6,053,368 A | 4/2000 | Geimer |
| 6,082,588 A | 7/2000 | Markey et al. |
| 6,119,899 A | 9/2000 | Iizuka et al. |
| 6,206,303 B1 | 3/2001 | Shinozaki et al. |
| 6,220,483 B1 | 4/2001 | Van der Heijden |
| 6,299,028 B1 | 10/2001 | Iizuka et al. |
| 6,302,304 B1 | 10/2001 | Spencer |
| D452,822 S | 1/2002 | Boshuizen et al. |
| D456,260 S | 4/2002 | Boshuizen et al. |
| 6,446,840 B2 | 9/2002 | Ophardt et al. |
| 6,669,056 B2 | 12/2003 | Bistolfi |
| 2002/0056730 A1 | 5/2002 | Van de Heijden |
| 2002/0070238 A1 | 6/2002 | Pritchett et al. |

FOREIGN PATENT DOCUMENTS

| | | |
|---|---|---|
| EP | 1 190 775 A1 | 3/2002 |
| JP | 07-061876 | 9/1996 |
| JP | 07-098108 | 10/1996 |
| JP | 07-274462 | 5/1997 |
| JP | 07-274463 | 5/1997 |
| JP | 07-281046 | 5/1997 |

*Primary Examiner*—Joseph A. Kaufman
(74) *Attorney, Agent, or Firm*—Thompson Coburn LLP

(57) ABSTRACT

A manually operated liquid foaming dispenser is attached to a bottle of liquid and pumps and mixes both the liquid and air to create a foam from the liquid and to dispense the foam. The dispenser includes a pump housing containing an air pump chamber and a liquid pump chamber, and a pump plunger that is manually reciprocated in both the air pump chamber and the liquid pump chamber. An air piston and a liquid piston are mounted on the plunger and are reciprocated by the plunger in the respective air pump chamber and liquid pump chamber. The air piston is mounted on the pump plunger for relative movement of the air piston on the plunger that enables an interior volume of the air pump chamber to be vented to an exterior environment of the dispenser on manual reciprocation of the pump plunger.

18 Claims, 5 Drawing Sheets

AIR FOAM PUMP WITH SHIFTING AIR PISTON

BACKGROUND OF THE INVENTION (1) Field of the Invention

The present invention pertains to a manually operated liquid foaming dispenser. Specifically, the invention pertains to a manually operated pump that is attached to the top of a bottle of liquid and that pumps and mixes both the liquid and air to create a foam from the liquid and dispense the foam. The dispenser includes a pump housing containing an air pump chamber and a liquid pump chamber, and a pump plunger that is manually reciprocated in both the air pump chamber and the liquid pump chamber. An air piston and a liquid piston are mounted on the plunger and are reciprocated by the plunger in the respective air pump chamber and liquid pump chamber.

(2) Description of the Related Art

There are various different types of manually operated liquid dispensers that pump liquid from containers attached to the dispensers and generate a foam from the liquid that is discharged from the dispensers. A familiar example of these types of foam generating liquid dispensers is the manually operated trigger sprayer. Trigger sprayers are designed to be comfortably held in one hand of a user with the trigger of the trigger sprayer being easily manipulated by the fingers of the user's hand. Pivoting movement of the trigger sprayer's trigger operates a liquid pump in the trigger sprayer. Operation of the pump draws liquid from a bottle container connected to the trigger sprayer and discharges the liquid in a spray pattern from a discharge nozzle of the trigger sprayer. The discharge nozzle of this type of trigger sprayer typically has an obstruction positioned in the path of the liquid sprayed from the trigger sprayer. The liquid spray hitting the obstruction mixes the liquid spray with the air of the exterior environment of the sprayer and thereby produces a foam that is discharged from the trigger sprayer.

The foaming liquid trigger sprayer of the type described above is well suited for dispensing a foam produced from a liquid where the desired foaming of the liquid is marginal, for example in dispensing foaming liquid kitchen or bathroom cleansers. However, the typical foaming liquid trigger sprayer cannot produce a more dense foam, such as that of shaving cream.

To produce a more dense foam dispensed from a manually operated foaming liquid dispenser requires that both the liquid and the air be pumped through the obstruction that produces the foam. Foaming liquid dispensers of this type comprise a pump housing containing an air pump chamber and a liquid pump chamber, and a pump plunger that is manually reciprocated in the pump housing. An air piston is mounted on the pump plunger and is received in the air pump chamber for reciprocating movement, and a liquid piston is mounted on the pump plunger and is received in the liquid pump chamber for reciprocating movement. Movement of the pump plunger toward a retracted position into the pump housing causes the air piston to move into the air pump chamber and exert a force on the air in the chamber and causes the liquid piston to move into the liquid pump chamber and exert a force on the liquid in the chamber. A pair of valves control the flow of air and liquid from the respective air pump chamber and liquid pump chamber through a center discharge passage of the pump plunger where the air and liquid is mixed to generate the foam. The foam is then discharged from the dispenser.

A spring of the foaming liquid dispenser causes the pump plunger to move from its retracted position in the pump housing to an extended position where the top portion of the pump plunger projects outwardly from the top of the pump housing. This movement of the pump plunger causes the air piston and the liquid piston to move out of their respective air pump chamber and liquid pump chamber, expanding the interior volumes of the two chambers. This creates vacuums in the two pump chambers that draw air into the air pump chamber interior volume and draw liquid into the liquid pump chamber interior volume. Valve assemblies are typically employed in controlling the flow of air and liquid into the respective air pump chamber and liquid pump chamber as their interior volumes are increased by the movement of the pump plunger. The valves allow air and liquid to enter the respective air pump chamber and liquid pump chamber as the pump plunger moves to its extended position, and the valves close preventing air and liquid from passing through the valves when the pump plunger is moved to its retracted position in the pump housing.

A substantial number of manually operated foaming liquid dispensers are manufactured to meet the needs of consumers. Reducing the manufacturing costs of a manually operated foaming liquid dispenser to only a small degree, for example by one penny or a fraction of a penny, significantly reduces the manufacturing costs of manually operated foaming liquid dispensers due to the significant number of the dispensers manufactured. Thus, a change in the design of a manually operated foaming liquid dispenser that results in even a small reduction in its manufacturing costs could result in a significant benefit to the manufacturing of manually operated foaming liquid dispensers.

SUMMARY OF THE INVENTION

The manually operated foaming liquid dispenser of the present invention has a novel and simplified construction with a reduced number of component parts from that of prior art dispensers that pump both air and liquid in generating a foam discharged from the dispenser. The novel construction of the foaming liquid dispenser eliminates a valve that controls the flow of air into the air pump chamber of the dispenser, thereby eliminating the cost of the valve and reducing the manufacturing costs of the dispenser. In addition, the manually operated foaming liquid dispenser of the invention has a more simplified construction than that of other prior art foaming liquid dispensers. The more simplified construction of the dispenser also results in a reduction in manufacturing costs. In addition, the novel construction of the foaming liquid dispenser vents the interior of the air pump chamber to the exterior environment of the dispenser immediately upon upward movement of the pump plunger. This ensures that the air pump chamber is vented with air even when the user of the dispenser quickly reciprocates the pump plunger in the pump housing without allowing the pump plunger to return to its fully extended position relative to the pump housing.

The pump housing of the foaming liquid dispenser of the invention combines a connector cap, an air pump chamber and a liquid pump chamber as one, monolithic piece. The liquid pump chamber, the air pump chamber, and the connector cap have a common center axis and are aligned axially in the pump housing. The cylindrical liquid pump chamber is positioned at the bottom of the pump housing. An opening in the top of the liquid pump chamber communicates the interior volume of the liquid pump chamber with the cylindrical air pump chamber just above. The air pump chamber also has an opening at its top that communicates the interior volume of the air pump chamber with the exterior environment of the dispenser through a top opening of the pump housing. The connector cap surrounds the pump housing top opening.

A dip tube is attached to the bottom of the pump housing and extends downwardly from the liquid pump chamber. A liquid inlet control valve is positioned at the bottom of the liquid pump chamber. The liquid inlet control valve controls a flow of liquid through the dip tube and into the liquid pump chamber, and prevents the reverse flow.

The pump housing is connected to a bottle containing a liquid by first inserting the liquid pump chamber and the air pump chamber through a bottle neck opening of the bottle. The connector cap is attached to the exterior of the bottle neck with the air pump chamber and liquid pump chamber positioned in the bottle. The dip tube extends downwardly from the pump housing into the liquid contained in the bottle to a position adjacent the bottom of the bottle.

A pump plunger is assembled into the pump housing through the top opening of the pump housing. The pump plunger has a tubular length with an interior discharge passage extending through the length of the pump plunger. A liquid piston is assembled to the exterior of the pump plunger and is received in the liquid pump chamber for reciprocating movement therein. An air piston is also assembled to the exterior of the pump plunger and is received in the air pump chamber for reciprocating movement therein.

A liquid outlet valve is assembled in the interior discharge passage of the pump plunger adjacent the bottom of the plunger. The liquid outlet valve controls the flow of liquid out of the liquid pump chamber and into the plunger discharge passage, and prevents the reverse flow of liquid. An air outlet valve is also assembled in the interior discharge passage of the pump plunger at an intermediate position along the passage. The air outlet valve controls the flow of air out of the air pump chamber and into the plunger discharge passage, and prevents the reverse flow of air.

A spring is assembled between the pump housing and the pump plunger. The spring biases the pump plunger to an extended position of the plunger relative to the pump housing where a top portion of the pump plunger projects outwardly from the top of the pump housing.

The pump plunger includes a dispenser head at the top of the pump plunger. The dispenser head has a tubular center column and a spout that both function as a portion of the pump plunger interior discharge passage. The dispenser head center column and spout conduct a foam produced by the dispenser, and the spout discharges the foam from the dispenser.

Manually depressing the pump plunger into the pump housing compresses the spring and causes the air piston to move downwardly into the air pump chamber decreasing the interior volume of the air pump chamber. The downward movement of the pump plunger also causes the liquid piston to move downwardly into the liquid pump chamber decreasing the interior volume of the liquid pump chamber. The downward movement of the pump plunger causes the air piston to pressurize the air in the air pump chamber. The pressurized air causes the air outlet valve to unseat, which allows air from the air pump chamber to pass the air outlet valve and enter the interior discharge passage of the pump plunger. The downward movement of the pump plunger also causes the liquid piston to exert a force on the liquid in the liquid pump chamber, which causes the liquid outlet valve to unseat. This results in the liquid in the liquid pump chamber being forced past the liquid outlet valve and into the interior discharge passage of the pump plunger. The air and liquid entering the interior passage of the pump plunger pass through a mixing element, which produces a foam from the air and liquid. The foam is forced upwardly through the pump plunger interior discharge passage and is dispensed from the pump plunger.

On completion of the downward movement of the pump plunger into the pump housing toward the retracted position of the pump plunger in the pump housing, the compressed spring causes the pump plunger to move out of the pump housing toward its extended position relative to the pump housing. This in turn causes the air piston and liquid piston to move upwardly in the respective air pump chamber and liquid pump chamber, creating a vacuum pressure in each of these chambers. The vacuum pressure in the liquid pump chamber causes the liquid inlet valve to unseat, thereby drawing liquid upwardly from the dip tube into the liquid pump chamber.

The novel construction of the manually operated foaming liquid dispenser of the invention does not include a separate valve that opens in response to the vacuum created in the air pump chamber to allow air to vent into the air pump chamber. Instead, the air piston of the dispenser is constructed with a center hole that functions as a vent hole for the air pump chamber. The pump plunger extends through the vent hole of the air piston. This mounts the air piston on the pump plunger for limited axial movement of the air piston relative to the pump plunger.

The pump plunger is constructed with a first, upper projection on its exterior and a plurality of second, lower projections on its exterior. The first projection and the plurality of second projections are on axially opposite sides of the piston. The axial spacing between the first projection and the plurality of second projections permits the air piston to move axially relative to the pump plunger between the projections. The exterior diameter dimension of the plunger between the first, upper projection and the second, lower projections is slightly smaller than the interior diameter dimension of the air piston vent hole. This provides a radial spacing between the exterior surface of the pump plunger and the interior surface of the air piston vent hole. This radial spacing defines a vent air flow path between the pump plunger and the air piston.

The first, upper projection is designed as an annular stopper. When the pump plunger moves downward relative to the air piston, the annular stopper engages in the air piston vent hole and seals the hole. The plurality of second, lower projections are spatially arranged around the exterior of the plunger. Each of the plurality of second, lower projections are dimensioned to engage in the vent hole of the air piston to stop the upward movement of the pump plunger relative to the air piston. However, because the plurality of second, lower projections are spatially arranged around the pump plunger, when the second, lower projections engage in the vent hole of the air pump piston they do not block the vent air flow path between the pump plunger and the air piston.

Thus, when the pump plunger is pushed manually downwardly into the pump housing, the pump plunger first, upper projection engages in and seals closed the vent hole of the air piston. This allows the air piston to compress the air in the air pump chamber as the pump plunger pushes the air piston downwardly into the air pump chamber. When the pump plunger is moved upwardly by the spring toward its extended position relative to the pump housing, the limited axial movement of the air piston relative to the pump plunger provided by the axially spaced first and second projections causes the first, upper projection to move out of the vent hole of the air piston. This opens the vent air flow path between the pump plunger and the interior surface of the air piston surrounding the vent hole. Thus, venting air from the exterior environment of the dispenser is allowed to pass through the vent air flow path between the pump plunger and the air piston as the air piston is moved upwardly through the air pump chamber by the pump plunger. This vents the interior volume of the air pump chamber without requiring an additional valve to control the venting of the air pump chamber.

Because the first and second projections on the pump plunger allow the air piston to move axially to a limited extent relative to the pump plunger, the air piston does not begin pressurizing air in the air pump chamber on the initial downward movement of the pump plunger into the pump housing. To ensure that both air and liquid are pumped into the pump plunger interior discharge passage at the same time, the liquid piston is also mounted on the pump plunger for limited axial movement of the liquid piston relative to the pump plunger. This allows the pump plunger to move downwardly into the pump housing the short distance required for the first, upper projection to seat in the vent hole of the air piston before the pump plunger begins pushing the liquid piston downwardly through the liquid pump chamber. The limited axial movement of the liquid piston relative to the pump plunger enables both the air piston and the liquid piston to begin their pumping operations from the respective air and liquid pump chambers at approximately the same time.

Thus, the foaming liquid dispenser of the invention enables mixing of air and liquid pumped into the dispenser discharge passage to generate a thick foam discharged by the dispenser while eliminating a valve required by prior art dispensers to vent air to the air pump chamber. The elimination of the valve results in a reduction of manufacturing costs. The simplified construction of the foaming dispenser with its reduced number of component parts also reduces the manufacturing cost of the dispenser. In addition, the assembly of the air piston on the pump plunger that enables limited axial movement between the air piston and the pump plunger vents the interior of the air pump chamber promptly on upward movement of the pump plunger. This ensures that the air pump chamber is vented with air even when a user of the dispenser quickly reciprocates the pump plunger in the pump housing without allowing the pump plunger to return to its fully extended position relative to the pump housing.

DESCRIPTION OF THE DRAWINGS

Further features of the invention are set forth in the following detailed description of the preferred embodiment of the invention and in the drawing figures wherein.

DETAILED DESCRIPTION OF THE PREFERRED EMBODIMENT

The foaming liquid dispenser 10 of the present invention is similar to the types of dispensers known in the prior art as lotion dispensers. These types of dispensers are typically operated by connecting the dispenser to the neck of a bottle container containing a liquid to be dispensed and by orienting the dispenser and the container vertically upright. In the description of the foaming liquid dispenser of the invention to follow, the terms "top" and "bottom", "upper" and "lower", or similar related terms will be used to describe the component parts of the dispenser and their relative positions. These terms are only used because the dispenser is typically oriented vertically upright when using the dispenser. The terms should not be interpreted as limiting.

Figure 1:
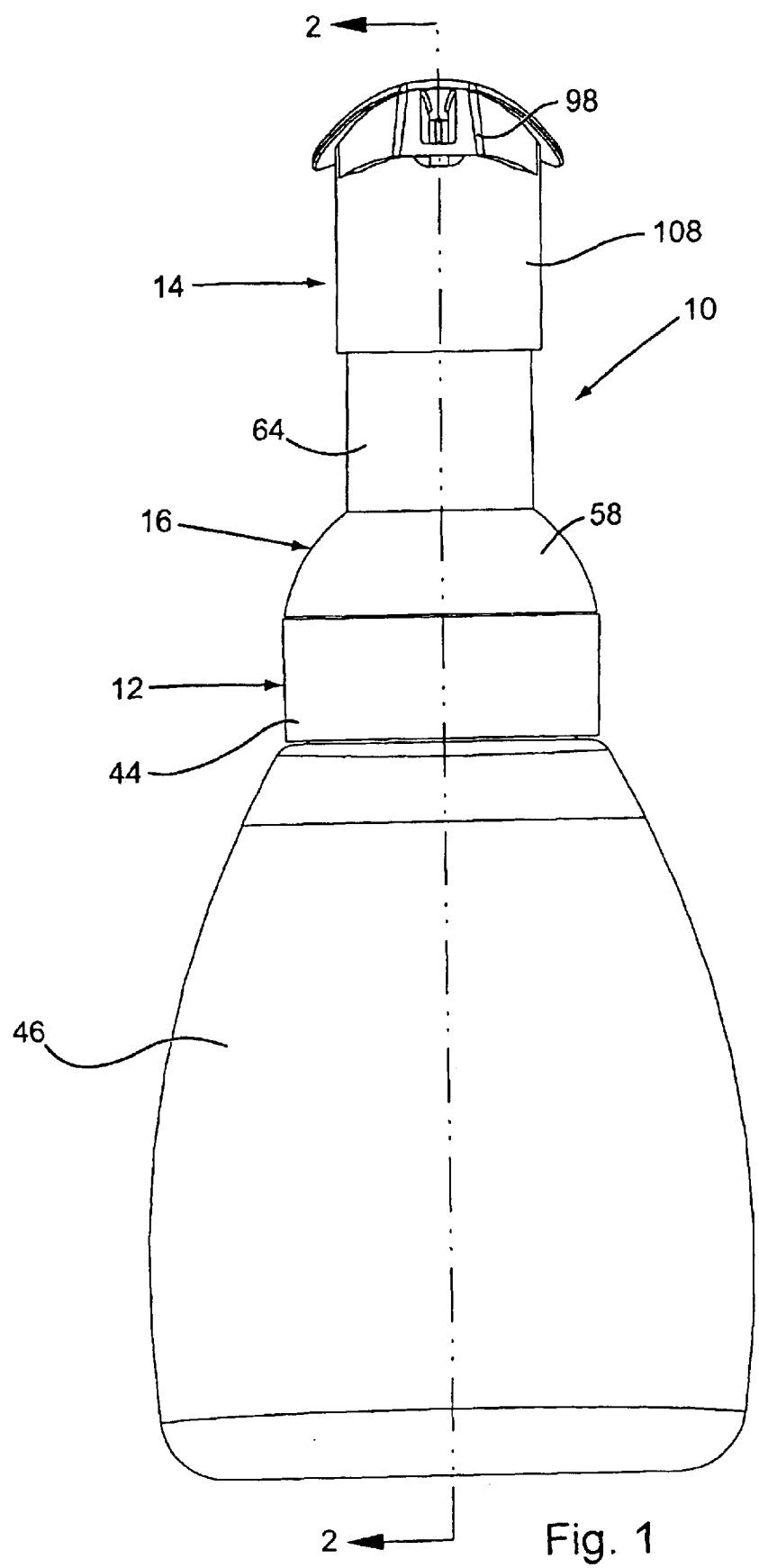
FIG. 1 is a front perspective view of the manually operated, foaming liquid dispenser of the invention attached to the top of a bottle container.
Figure 2:
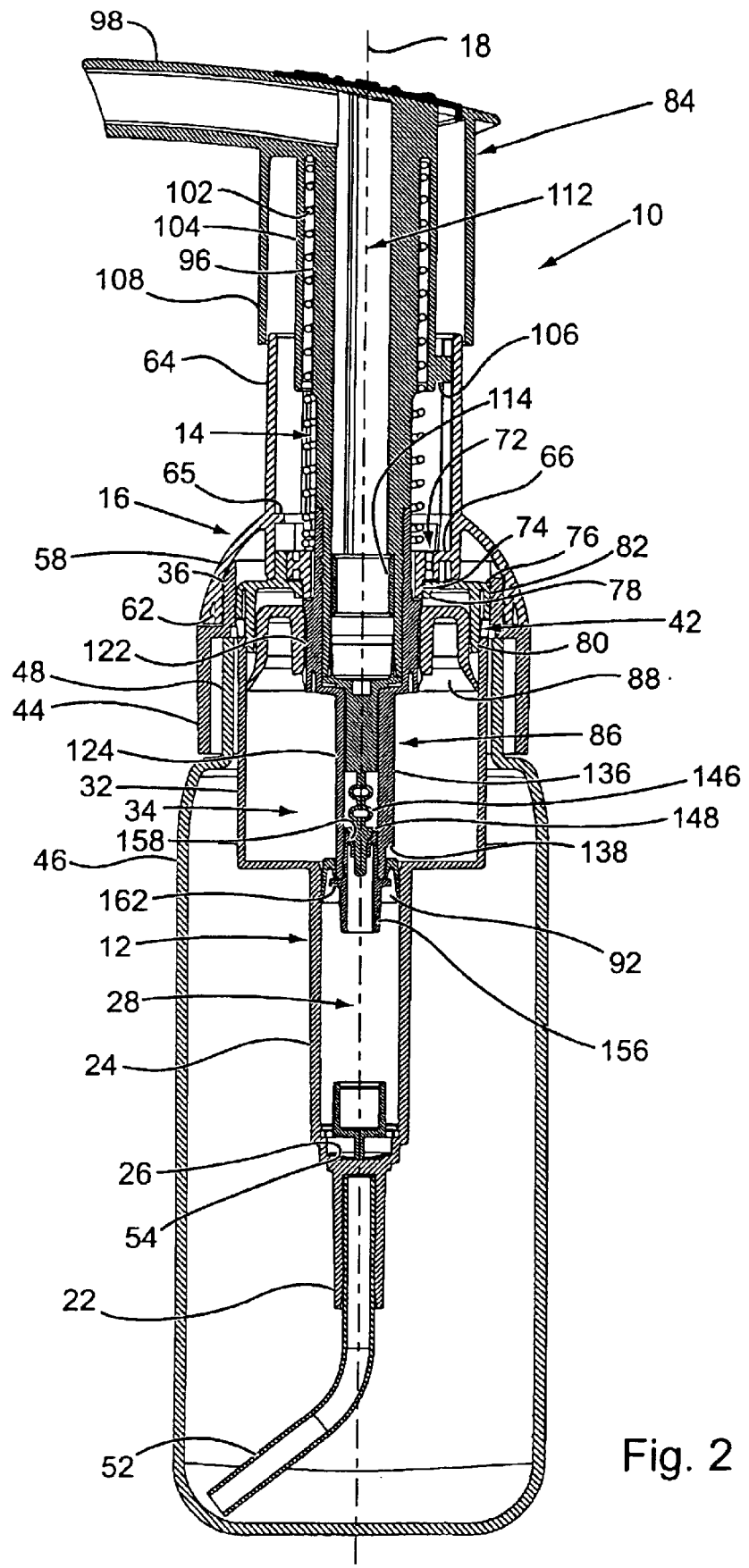
FIG. 2 is a side, sectioned view of the dispenser along the line 2—2 of FIG. 1, with the pump plunger in its fully extended position relative to the pump housing and the bottle container.
Figure 4:
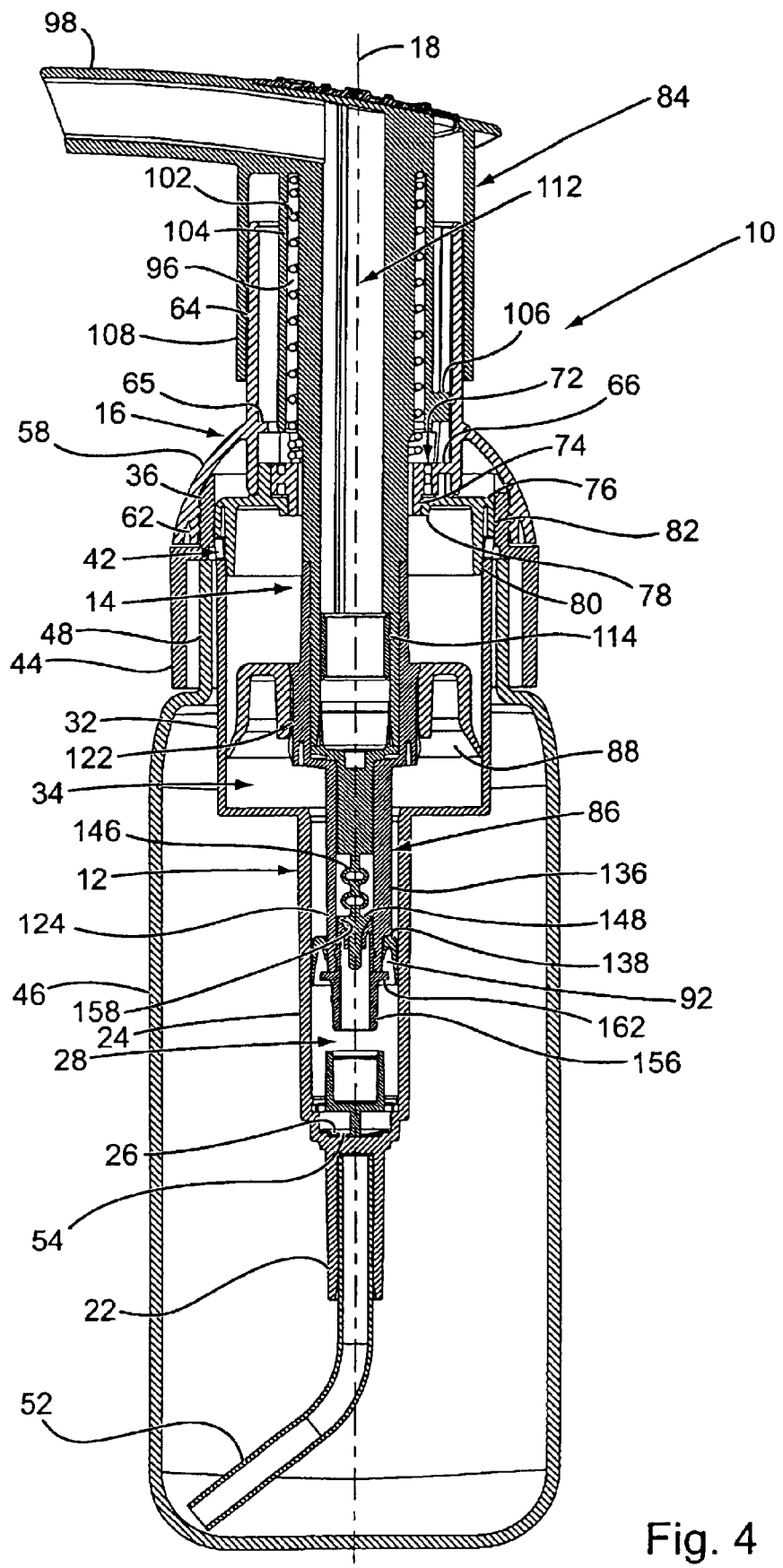
FIG. 4 is a side, sectioned view of the dispenser with the pump plunger in its fully retracted position relative to the pump housing and the bottle container; and, FIG. 5 is a partial, enlarged view of the relative positions of the air piston and the pump plunger shown in FIG. 4.

The liquid foaming dispenser 10 shown in FIGS. 1, 2, and 4 is basically comprised of a pump housing 12, a pump plunger 14 and a snap ring 16 that connects the pump housing and pump plunger together. The materials employed in constructing the component parts of the dispenser are the same as those typically used in the industry, usually plastics except for a metal coil spring employed on the pump plunger.

The pump housing 12 basically combines four cylindrical sections of the pump housing and a connector cap as one, monolithic piece. The cylindrical sections of the housing and the connector cap have a common center axis 18 and are axially aligned in the pump housing.

The cylindrical sections include a cylindrical dip tube connector 22 provided at the bottom of the pump housing. A cylindrical liquid pump chamber 24 is provided as the second cylindrical section of the pump housing just above the dip tube connector 22. A valve seat surface 26 is positioned at the bottom of the liquid pump chamber 24. The interior volume 28 of the liquid pump chamber 24 communicates with the interior of the dip tube connector 22 through the valve seat 26. The liquid pump chamber 24 is open at its top end.

The third cylindrical section of the pump housing 12 is a cylindrical air pump chamber 32 positioned just above the liquid pump chamber 24. The air pump chamber 32 has an interior volume 34 that communicates with the liquid pump chamber interior volume 28 through the top opening of the liquid pump chamber 24. The air pump chamber 32 is open at its top end.

A cylindrical sleeve 36 forms the fourth cylindrical section of the pump housing 12. The sleeve 36 extends upwardly from the top of the air pump chamber 32. Several bottle container vent holes 42 pass through the sleeve 36. The cylindrical sleeve 36 is also open at its top.

The cylindrical connector cap 44 is attached to the bottom of the sleeve 36. As seen in FIGS. 2 and 4, the connector cap 44 extends downwardly over and is spaced radially outwardly from the air pump chamber 32. An interior surface of the connector cap 44 is provided with a mechanical connector, for example a bayonet type connector or a screw-threaded connector. The particular connector employed on the connector cap 44 will be complementary to a connector on a bottle container with which the liquid foaming dispenser 10 is used.

As stated earlier, the dip tube connector 22, the liquid pump chamber 24, the air pump chamber 32, the cylindrical sleeve 36 and the connector cap 44 of the pump housing 12 are all formed as one, monolithic piece. Forming all of these component parts as one piece reduces the total number of the separate component parts of the liquid foaming dispenser 10. This reduction imparts also results in a cost savings in manufacturing the dispenser.

The pump housing 12 is shown mounted on a bottle container 46 in FIGS. 1, 2, and 4. The bottle container 46 shown in the drawing figures is only one example of a bottle container with which the liquid foaming dispenser 10 may be used. In removably attaching the pump housing 12 to the bottle container 46, the bottle container is provided with a neck 48 having a mechanical connector that is complementary to the mechanical connector of the pump housing connector cap 44. With the pump housing 12 removably attached to the bottle container 46 by the connector cap 44, the liquid pump chamber 24 and the air pump chamber 32 of the pump housing 12 are entirely contained inside the bottle container 46. This reduces the overall size of the liquid foaming dispenser 10 and bottle container 46.

A dip tube 52 is attached to the dip tube connector 22 at the bottom of the pump housing. The dip tube 52 extends downwardly from the pump housing 12 into the liquid of the container to a position adjacent the bottom of the bottle container 46.

A liquid inlet control valve 54 is positioned at the bottom of the liquid pump chamber 24. The liquid inlet control valve 54 is a flexible, resilient disk check valve that seats against the valve seat surface 26 at the bottom of the liquid pump chamber 24. The liquid inlet control valve 54 is responsive to a vacuum pressure created in the interior volume 28 of the liquid pump chamber 24. The valve 54 controls a flow of liquid from the bottle container 46 through the dip tube 52 and into the liquid pump chamber interior volume 28, and prevents the reverse flow of liquid.

The snap ring 16 is assembled to the top of the pump housing 12. The snap ring 16 has a top cover 58 and a cylindrical outer wall 62 that fits snug around the cylindrical sleeve 36 of the pump housing 12. A cylindrical tube 64 extends upwardly from the snap ring cover 58. A lock tab 65 projects inwardly from an interior surface of the tube 64. The upper portion of the tube 64 above the snap ring cover 58 provides an aesthetic cover for an upper portion of the pump plunger 14 and a spring mounted on the pump plunger that is yet to be described. A portion of the tube 64 extends below the snap ring cover 58 to a circular bottom wall 66 of the snap ring. The snap ring bottom wall 66 has an opening 68 at its center to accommodate the pump plunger 14, as will be described. A bottle vent hole 72 also extends through the snap ring bottom wall 66. A cylindrical plunger tube 74 extends downwardly from the underside of the snap ring bottom wall 66. The plunger tube 74 limits the upward movement of the pump plunger 14 relative to the pump housing 12 to the extended position of the pump plunger shown in FIGS. 1 and 2.

A cylindrical vent separator 76 is assembled onto the exterior of the snap ring plunger tube 74 and into the interior of the pump housing cylindrical sleeve 36. The vent separator 76 is formed as a flat ring with a downwardly extending inner cylindrical wall 78, a downwardly extending intermediate cylindrical wall 80, and a downwardly extending outer cylindrical wall 82. The inner cylindrical wall 78 of the vent separator 76 extends downwardly from the inner edge of the separator and engages tightly against the outer surface of the snap ring plunger tube 74. The intermediate wall 80 extends over the interior surface of the air pump chamber 32. The outer cylindrical wall 82 extends downwardly from an outer peripheral edge of the vent separator 76 over the interior surface of the pump housing cylindrical sleeve 36. A gap is provided between the vent separator outer wall 82 and the pump housing sleeve 36. This gap functions as a portion of an air venting flow path from the exterior environment of the dispenser, between the vent separator outer wall 82 and the sleeve 36, and through the pump housing bottle vent holes 42.

The pump plunger 14 is basically comprised of an upper dispenser head 84, a lower piston rod 86, an air piston 88 mounted on the piston rod 86, and a liquid piston 92 mounted on the piston rod 86.

The upper dispenser head 84 has a tubular center column 96 that extends downwardly through the dispenser head. The column 96 is open at its bottom. An interior bore of the column communicates with a discharge spout 98 of the dispenser head at the top of the column.

A metal coil spring 102 is mounted over the center column 96. The spring engages against the snap ring bottom wall 66 at the bottom of the spring and engages against the dispenser head 84 at the top of the spring. The spring 102 urges the dispenser head and the pump plunger 14 upwardly to its extended position shown in FIGS. 1 and 2.

An inner cylindrical wall 104 of the dispenser head 84 extends downwardly over the spring. The inner cylindrical wall 104 has a lock tab 106 that projects outwardly from the wall. The dispenser head 84 can be pressed downwardly against the bias of the spring 102 and rotated so that the dispenser head lock tab 106 engages underneath the snap ring lock tab 65 to hold the dispenser head 84 in its downward, retracted position relative to the dispenser 10.

The dispenser head also has an outer cylindrical wall 108. The outer wall 108 telescopes over the snap ring tube 64. The overlapping of the outer wall 108 and the snap ring tube 64 prevents liquid from entering into the pump plunger 14 and also gives the dispenser an aesthetically pleasing appearance.

The interior bore of the dispenser head center column 96 and an interior bore of the dispenser head spout 98 define a portion of an interior discharge passage 112 of the pump plunger that extends through the length of the dispenser head 84. A foam producing obstruction is positioned in the interior discharge passage 112 adjacent the bottom of the passage. The obstruction is comprised of a cylindrical hub 114 having mesh screens 116 covering over the opposite open ends of the hub. Air and liquid passing through the two mesh screens 116 of the hub 114 produce a foam.

The pump plunger piston rod 86 is tubular and an upper end of the piston rod is attached to a lower end of the dispenser head center column 96. The tubular piston rod 86 has an interior bore that extends through the length of the rod and communicates with the interior bore of he dispenser head center column 96. The interior bores of the piston rod 86; the dispenser head center column 96 and the spout 98 define the length of the interior discharge passage 112 extending through the pump plunger 14. The portion of the discharge passage 112 extending through the piston rod 86 and the dispenser head center column 96 has a center axis that is coaxial with the center axis 18 of the pump housing 12.

The piston rod 86 has a cylindrical, upper air piston portion 122 and a cylindrical, lower liquid piston portion 124. The air piston portion 122 has a cylindrical interior surface that extends downwardly through the piston rod to an annular bottom wall 126 that joins the air piston portion 122 to the liquid piston portion 124 of the piston rod. A pair of diametrically opposed valve openings 128 (only one of which is visible in FIG. 5) extend through the annular bottom wall 126. The liquid piston portion 124 of the piston rod also has a cylindrical interior surface that extends downwardly from the annular bottom wall 126 to the bottom end of the piston rod 86.

Figure 3:
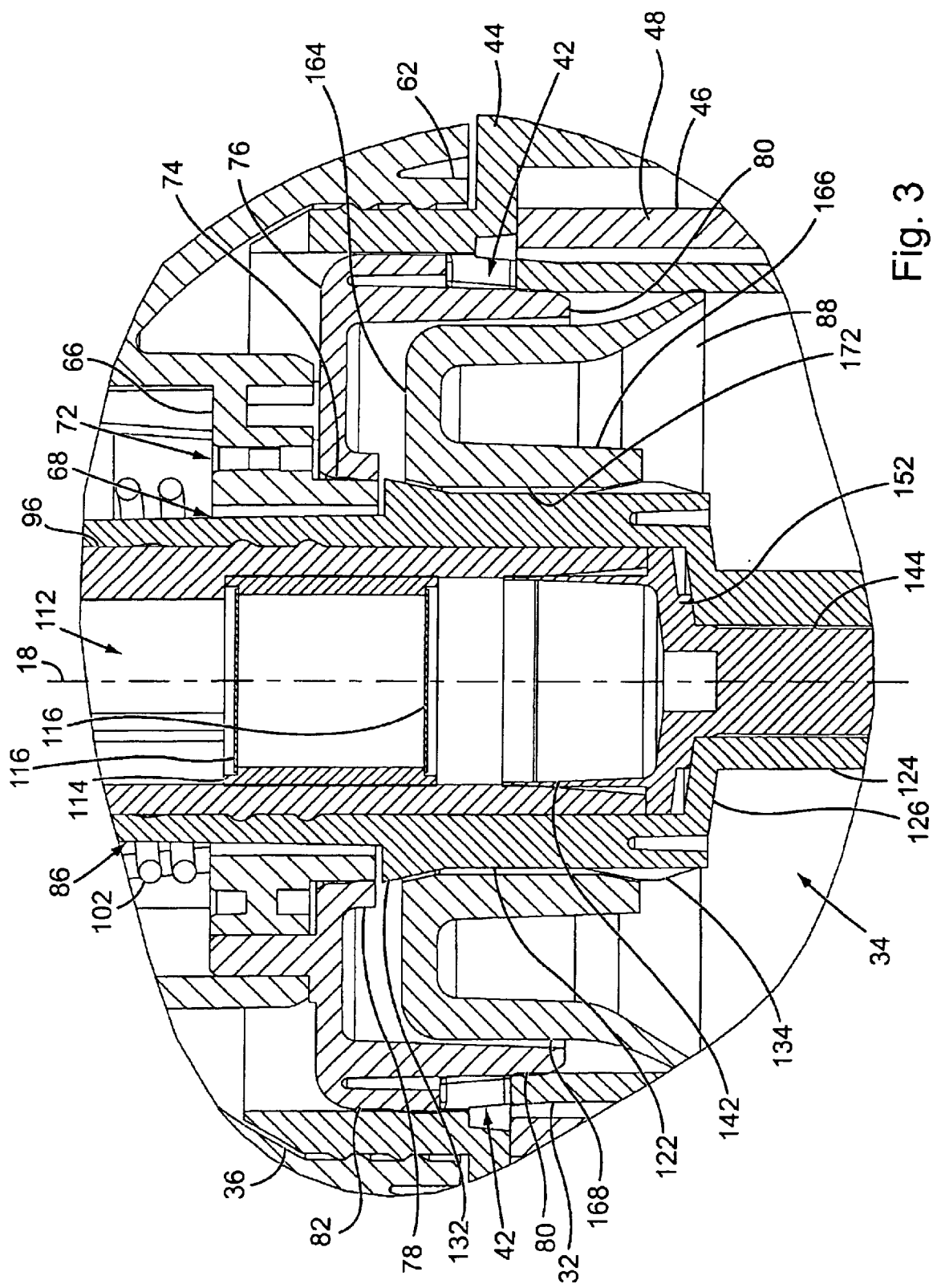
FIG. 3 is a partial, enlarged view of the relative positions of the air piston and pump plunger shown in FIG. 2.
Figure 5:
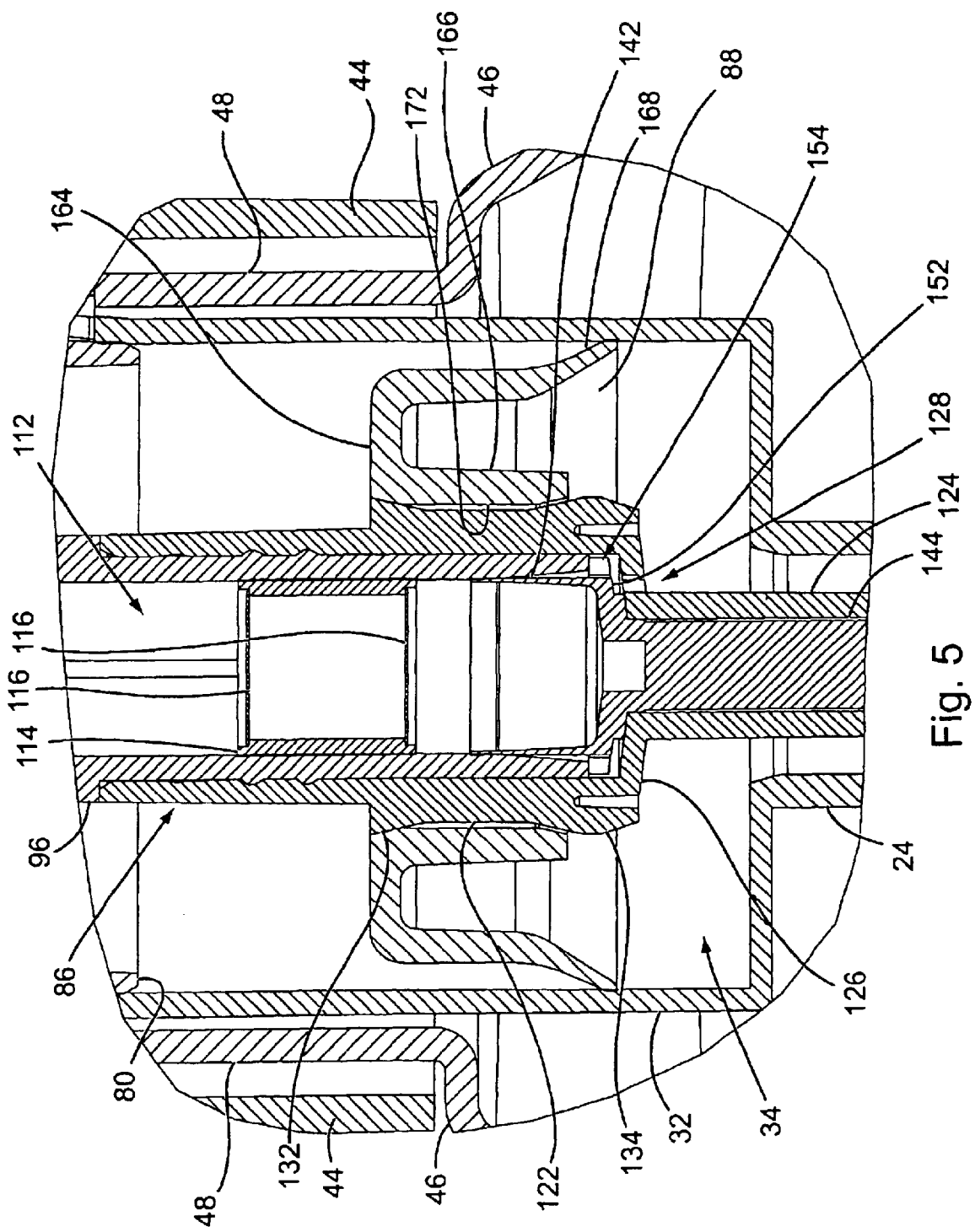

The exterior surface of the air piston portion 122 of the piston rod is provided with a first, upper projection 132 and a plurality of second, lower projections 134. The first projection 132 is an annular projection that extends completely around the air piston portion 122 of the piston rod. As best seen in FIGS. 3 and 5, the first projection 132 tapers radially outwardly as it extends axially upwardly over the exterior surface of the piston rod. Each of the plurality of second projections 134 is formed as a narrow ridge that projects radially outwardly from the piston rod air piston portion 122 as it extends axially over the exterior surface of the rod. The second projections 134 are spatially arranged around the exterior surface of the piston rod air piston portion 122.

An axial rib 136 is provided on the exterior surface of the piston rod liquid piston portion 124. The rib 136 extends downwardly over the exterior surface of the liquid piston portion 124 but stops short of the bottom end of the piston rod, forming a radial shoulder 138 that projects outwardly from the liquid piston portion 124 of the rod.

A one-piece valve assembly including a tubular sleeve valve 142, a center stem 144, a resilient spring 146 and a plug check valve 148 is assembled into the interior of the dispenser piston rod 86. The tubular sleeve valve 142 projects upwardly from an annular bottom wall 152 of the valve assembly. The bottom wall 152 has an opening at its center that communicates with the interior of the liquid piston portion 124 of the piston rod and forms a portion of the interior discharge passage 112 extending through the pump plunger. The outer periphery of the bottom wall 152 engages against the interior surface of the air piston portion 122 of the piston rod and secures the valve assembly in place. A pair of diametrically opposed notches 154 pass through the bottom wall 152 in positions that coincide with the valve openings 128 of the piston rod annular wall 126. The resilient sleeve 142 of the valve assembly extends upwardly from the bottom wall 152 inside the pair of notches 154 and engages against the interior surface of the dispenser head center column 96 in a sealing engagement.

The center stem 144 of the valve assembly has a +-shaped cross section. The stem 144 engages against the interior surface of the liquid piston portion 124 of the piston rod to securely hold the valve assembly in place while allowing liquid to flow axially along the center stem 144. The resilient spring 146 extends downwardly from the bottom end of the stem 144 and biases the plug check valve 148 downwardly.

A valve seat plug 156 is inserted into the opening at the bottom of the liquid piston portion 124 of the piston rod. The valve seat plug 156 has a seating surface 158 against which the plug check valve 148 engages. An annular ring 162 on the valve seat plug 156 engages against the bottom of the liquid piston portion 124 of the piston rod to insure that the valve seat plug is properly positioned. The plug check valve 148 engaging against the seating surface 158 of the valve seat plug 156 functions as a liquid outlet valve of the liquid pump chamber 124.

The liquid piston 92 is mounted on the bottom end of the liquid piston portion 124 of the piston rod between the annular ring 162 of the valve seat plug 156 and the radial shoulder 138 of the piston rod axial rib 136. As best seen in FIG. 4, an axial spacing between the valve seat plug annular ring 162 and shoulder 138 of the axial rib 136 allows the liquid piston 92 to move axially over the pump plunger 14 for a short distance. The liquid piston 92 is positioned in the liquid pump chamber 24 in a sliding sealing engagement of the liquid piston against the interior surface of the liquid pump chamber. The engagement of the liquid piston 92 against the interior surface of the liquid pump chamber 24 causes the liquid piston to move upwardly relative to the pump plunger 14 when the plunger is moved downwardly until the liquid piston 92 engages against the shoulder 138 of the axial rib 136. The liquid piston 92 also moves downwardly relative to the pump plunger 14 when the pump plunger is moved upwardly until the liquid piston 92 engages with the annular ring 162 of the valve seat plug 156.

The air piston 88 is formed as a flat ring 164 with a downwardly extending inner cylindrical wall 166 at an inner peripheral edge of the ring and a downwardly extending outer cylindrical wall 168 at an outer peripheral edge of the ring. The air piston inner cylindrical wall 166 has an interior surface 172 that is spaced a small distance radially outwardly from the exterior surface of the piston rod air piston portion 122. This creates a small annular gap between the exterior surface of the piston rod air piston portion 122 and the interior surface 172 of the air piston inner cylindrical wall 166 that functions as an air vent flow path. The radial spacing between the exterior surface of the piston rod air piston portion 122 and interior surface 172 of the air piston inner cylindrical wall 166 defines a vent opening or a vent hole through the air piston 88 through which the pump plunger 14 extends. The radial spacing between the exterior surface of the piston rod air piston portion 122 and the air piston inner cylindrical wall interior surface 172 enables the air piston 88 to move axially to a limited extent relative to the pump plunger 14. The extent of axial movement of the air piston 88 on the pump plunger 14 is limited by the first, upper projection 132 of the pump plunger above the air piston, and the second, lower projections 134 below the air piston.

The air piston flat ring 164 extends radially outwardly from the air piston inner cylindrical wall 66 to the air piston outer cylindrical wall 168 to position the outer cylindrical wall where it will engage in a sliding, sealing engagement with the interior surface of the air pump chamber 32. The sliding, sealing engagement of the air piston outer cylindrical wall 168 with the air pump chamber 32 exerts a sufficient frictional resistance to movement of the air piston 88 relative to the air pump chamber 32 to cause the air piston 88 to move relative to the pump plunger 14 when the pump plunger is moved upwardly and downwardly in the pump housing 12.

The first, upper projection 132 of the pump plunger piston rod 86 is designed as an annular stopper. The upper projection 132 has an outer diameter dimension that is slightly larger than the inner diameter dimension of the air piston inner cylindrical wall interior surface 172. When the pump plunger 14 moves downward relative to the air piston 88, the annular stopper formed by the upper projection 132 engages in the air piston vent hole formed by the inner cylindrical wall interior surface 172 and seals the hole. Each of the plurality of second, lower projections 132 on the piston rod 86 are dimensioned to engage in the vent hole of the air piston defined by the inner cylindrical wall interior surface 172. The plurality of second, lower projections 134 stop the upward movement of the pump plunger 14 relative to the air piston 88. However, because the plurality of second, lower projections 134 are spatially arranged around the pump plunger 14, when the second, lower projections 134 engage in the vent hole of the air piston defined by the inner cylindrical wall interior surface 172, they do not block the vent air flow path between the exterior surface of the piston rod air piston portion 122 and the interior surface 172 of the air piston inner cylindrical wall 166.

Thus, when the pump plunger 14 is pushed manually downwardly into the pump housing 12, the pump plunger first, upper projection 132 engages in and seals closed the vent hole of the air piston defined by the interior surface 172 of the air piston inner cylindrical wall 166. This allows the air piston 88 to compress the air in the air pump chamber 32 as the pump plunger 14 pushes the air piston 88 downwardly into the air pump chamber 32. When the pump plunger 14 is moved upwardly by the spring 102 toward its extended position relative to the pump housing 112, the limited axial movement of the air piston 88 relative to the pump plunger 14 provided by the axially spaced first projection 132 and second projections 134 causes the first, upper projection 132 to move out of the vent hole of the air piston defined by the inner surface 172 of the air piston inner cylindrical wall 66. This opens the vent air flow path between the exterior surface of the piston rod air piston portion 122 and the air piston inner cylindrical wall interior surface 172. Thus, venting air from the exterior environment of the dispenser 10 is allowed to pass through the telescoping coupling of the dispenser head outer cylindrical wall 108 and the snap ring tube 64, and between the exterior surfaces of the pump plunger upper dispenser head 84 and lower piston rod 86 and the interior surface of the snap ring plunger tube 74, to the vent air flow path between the exterior surface of the piston rod air piston portion 122 and the air piston inner cylindrical wall interior surface 172 as the air piston 88 is moved upwardly through the air pump chamber 32 by the pump plunger 14. This vents the interior volume 34 of the air pump chamber 32 without requiring an additional valve to control the venting of the air pump chamber.

Because the first 132 and second projections 134 on the pump plunger 14 allow the air piston 88 to move axially to a limited extent relative to the pump plunger, the air piston 88 does not begin pressurizing air in the air pump chamber 32 on the initial downward movement of the pump plunger 14 into the pump housing 12. To ensure that both air and liquid are pumped into the pump plunger interior discharge passage 112 at the same time, the liquid piston 92 has been mounted on the piston rod liquid piston portion 124 for a limited axial movement of the liquid piston relative to the pump plunger. This allows the pump plunger 14 to move downwardly into the pump housing 12 a short distance required for the first, upper projection 132 to seat in sealing engagement in the vent hole of the air piston defined by the air piston inner cylindrical wall interior surface 172 before the pump plunger begins pushing the liquid piston 92 downwardly through the liquid pump chamber 24. The limited axial movement of the liquid piston 92 relative to the pump plunger 14 enables both the air piston 88 and the liquid piston 92 to begin their pumping operations from the respective air pump chamber 32 and liquid pump chamber 24 at approximately the same time.

Thus, the foaming liquid dispenser of the invention enables mixing of air and liquid pumped into the dispenser discharge passage to generate a thick foam discharged by the dispenser while eliminating a valve required by prior art dispensers to vent air to the air pump chamber. The elimination of the air vent valve results in a reduction of manufacturing costs. The simplified construction of the foaming dispenser also combines several different component parts of prior art foaming dispensers into one piece. This simplified construction also reduces the manufacturing cost of the dispenser. In addition, the assembly of the air piston on the pump plunger that enables limited axial movement between the air piston and the pump plunger vents the interior of the air pump chamber promptly on upward movement of the pump plunger. This ensures that the air pump chamber is vented with air even when a user of the dispenser quickly reciprocates the pump plunger in the pump housing without allowing the pump plunger to return to its fully extended position relative to the pump housing. Although the manually operated foaming liquid dispenser of the invention has been described above by reference to a single embodiment, it should be understood that modifications and variations could be made to the dispenser without departing from the intended scope of the invention defined by the following claims.

What is claimed is:

1. A liquid dispenser comprising:

a pump housing having a liquid pump chamber and an air pump chamber;

a pump plunger in the pump housing, the pump plunger having a center axis that defines mutually perpendicular axial and radial directions and the pump plunger having an interior discharge passage that extends axially through the pump plunger;

a liquid piston on the pump plunger and positioned in the liquid pump chamber defining an interior volume of the liquid pump chamber, the liquid piston being moveable between charge and discharge positions in the liquid pump chamber where the liquid piston respectively increases and decreases the interior volume of the liquid pump chamber;

an air piston on the pump plunger and positioned in the air pump chamber defining an interior volume of the air pump chamber, the air piston being moveable between charge and discharge positions in the air pump chamber where the air piston respectively increases and decreases the interior volume of the air pump chamber, and the air piston being moveable with respect to the pump plunger between vent open and vent closed positions of the air piston relative to the pump plunger where in the vent open position of the air piston the air pump chamber is vented to an exterior environment of the dispenser to vent air to the air pump chamber interior volume and in the vent closed position of the air piston the air pump chamber is sealed closed from the exterior environment of the dispenser;

a vent hole passing through the air piston; and, the pump plunger extending through the air piston vent hole, the air piston vent hole defining a venting air flow path between the plunger and the air piston that vents the air pump chamber interior volume to the exterior environment of the dispenser when the air piston is moved to the vent open position relative to the pump plunger.

2. The dispenser of claim 1, further comprising:

the air piston being mounted on the pump plunger for limited axial movement of the air piston between the vent open position and the vent closed position of the air piston relative to the pump plunger.

3. The dispenser of claim 1, further comprising:

the vent hole being the only hole through the air piston.

4. The dispenser of claim 1, further comprising:

the liquid piston being mounted on the pump plunger for limited axial movement of the liquid piston relative to the pump plunger.

5. The dispenser of claim 4, further comprising:
a liquid pump chamber outlet valve positioned in the pump plunger discharge passage to control a flow of liquid out of the liquid pump chamber and through the pump plunger discharge passage, the outlet valve being separate from the liquid piston.

6. A liquid dispenser comprising:
a pump housing having a liquid pump chamber and an air pump chamber;
a pump plunger in the pump housing, the pump plunger having a center axis that defines mutually perpendicular axial and radial directions and the pump plunger having an interior discharge passage that extends axially through the pump plunger;
a liquid piston on the pump plunger and positioned in the liquid pump chamber defining an interior volume of the liquid pump chamber, the liquid piston being moveable between charge and discharge positions in the liquid pump chamber where the liquid piston respectively increases and decreases the interior volume of the liquid pump chamber;
an air piston on the pump plunger and positioned in the air pump chamber defining an interior volume of the air pump chamber, the air piston being moveable between charge and discharge positions in the air pump chamber where the air piston respectively increases and decreases the interior volume of the air pump chamber, and the air piston being moveable with respect to the pump plunger between vent open and vent closed positions of the air piston relative to the pump plunger where in the vent open position of the air piston the air pump chamber is vented to an exterior environment of the dispenser to vent air to the air pump chamber interior volume and in the vent closed position of the air piston the air pump chamber is sealed closed from the exterior environment of the dispenser;
a hole passing through the air piston; and,
the pump plunger extending through the air piston hole thereby mounting the air piston on the pump plunger for movement of the air piston between the vent open and vent closed positions of the air piston relative to the pump plunger;
a first projection on the pump plunger on one side of the air piston;
a second projection on the pump plunger spaced axially from the first projection on an opposite side of the air piston from the first projection, the first projection and second projection limiting the movement of the air piston relative to the pump plunger in the axial spacing between the first projection and second projection.

7. The dispenser of claim 6, further comprising:
the air piston hole defining a vent air flow path between the plunger and the air piston that vents the air pump chamber interior volume to an exterior environment of the dispenser when the vent piston is moved to the vent open position relative to the pump plunger; and,
the first projection being positioned on the plunger to engage with the air piston and close the air piston hole and the vent air flow path when the air piston is moved to the vent closed position relative to the pump plunger.

8. The dispenser of claim 7, further comprising:
the first projection being an annular stopper that extends around the pump plunger and is positioned to engage in the air piston hole when the air piston is in the vent closed position relative to the plunger to close the air piston hole.

9. The dispenser of claim 7 further comprising:
the second projection being positioned on the pump plunger to engage with the air piston when the air piston is moved to the vent open position relative to the pump plunger to stop movement of the air piston and keep open the vent air flow path between the pump plunger and the air piston.

10. The dispenser of claim 5, further comprising:
the second projection being one of a plurality of second projections on the pump plunger, the plurality of second projections being spatially arranged around the pump plunger in positions to engage the air piston when the air piston is moved to the vent open position and to keep open the vent air flow path between the pump plunger and the air piston.

11. A liquid dispenser comprising:
a pump housing having a liquid pump chamber and an air pump chamber;
a pump plunger mounted on the pump housing for reciprocating movement between an extended and a retracted position of the pump plunger relative to the pump housing, the pump plunger having a center axis that defines mutually perpendicular axial and radial directions and the pump plunger having an interior discharge passage that extends axially through the pump plunger;
a liquid piston on the pump plunger and positioned in the liquid pump chamber defining an interior volume of the liquid pump chamber, the liquid piston being moveable between charge and discharge positions in the liquid pump chamber in response to the pump plunger moving between the respective extended and retracted positions, where the liquid piston increases and decreases the interior volume of the liquid pump chamber when moved to the respective charge and discharge positions;
an air piston on the pump plunger and positioned in the air pump chamber defining an interior volume of the air pump chamber, the air piston being moveable between charge and discharge positions in the air pump chamber in response to the pump plunger moving between the respective extended and retracted positions, where the air piston increases and decreases the interior volume of the air pump chamber when moved to the respective charge and discharge positions;
a vent hole in the air piston, the vent hole defining a vent air flow path from the interior volume of the air pump chamber through the vent hole to an exterior environment of the dispenser;
a projection positioned on the plunger to open the air piston vent hole in response to the pump plunger being moved to the extended position and to close the vent hole in response to the pump plunger being moved to the retracted position; and,
the pump plunger extending through the air piston vent hole whereby the air piston is mounted on the pump plunger.

12. The dispenser of claim 11, further comprising:
the air piston being mounted on the pump plunger for axial movement of the air piston between vent open and vent closed positions of the air piston relative to the pump plunger in response to the pump plunger being moved between the respective extended and retracted positions, the projection on the pump plunger being displaced from the air piston vent hole in the vent open position of the air piston, and the projection on the pump plunger closing the air piston vent hole in the vent closed position of the air piston.

13. The dispenser of claim 11, further comprising:

the projection on the pump plunger being an annular projection that extends around the pump plunger and is positioned on the plunger to seat over the air piston vent hole to close the vent hole.

14. The dispenser of claim 13, further comprising:

the annular projection unseating from the air piston vent hole in response to the pump plunger being moved to the extended position and thereby establishing a vent air flow path from the air pump chamber interior volume and through a radial spacing between the pump plunger and the air piston to an exterior environment of the dispenser.

15. The dispenser of claim 13, further comprising:

the annular projection being on one side of the air piston and a second projection on an opposite side of the air piston from the annular projection, the annular projection and the second projection enabling limited axial movement of the air piston relative to the pump plunger between the annular projection and the second projection.

16. The dispenser of claim 15, further comprising:

the second projection being one of a plurality of second projections spacially arranged around the pump plunger in positions to engage with the air piston in the vent open position of the air piston and establish a vent air flow path between the pump plunger and the air piston venting the air pump chamber interior volume to an exterior environment of the dispenser.

17. The dispenser of claim 11, further comprising:

the liquid piston being mounted on the pump plunger for limited axial movement of the liquid piston relative to the pump plunger.

18. The dispenser of claim 11, further comprising:

the air piston vent hole being the only hole through the air piston.

* * * * *